Figure 1:
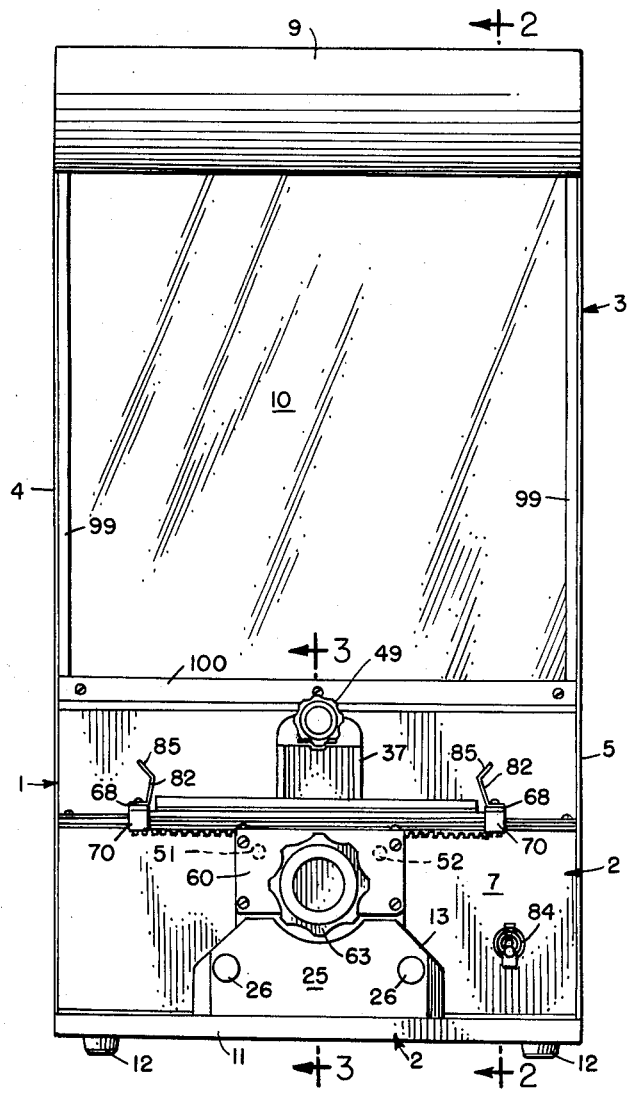

Dec. 21, 1965     P. J. BROWNSCOMBE     3,224,326
PROJECTOR VIEWER

Filed June 8, 1962     3 Sheets-Sheet 1

INVENTOR:
PHILIP J. BROWNSCOMBE
BY
ATT'YS

Dec. 21, 1965   P. J. BROWNSCOMBE   3,224,326
PROJECTOR VIEWER

Filed June 8, 1962   3 Sheets-Sheet 3

INVENTOR:
PHILIP J. BROWNSCOMBE
BY
ATT'YS

United States Patent Office 3,224,326
Patented Dec. 21, 1965

3,224,326
PROJECTOR VIEWER
Philip J. Brownscombe, Millington, N.J., assignor to Eugene Dietzgen Co., Chicago, Ill., a corporation of Delaware
Filed June 8, 1962, Ser. No. 201,046
2 Claims. (Cl. 88—24)

This invention, in general, relates to apparatus useful in viewing of an image, and has more particular reference to improved apparatus for holding an image-containing sheet in a plane, to mechanism for moving said holding means in a plane in at least two different lineal directions, and to the projection of an image in said holding means onto a screen for the viewing or reading of the projected image.

The use of microfilm for the storage of copies of papers of a diverse nature in government and business records has grown significantly in the past decade. The microfilm reduces considerably the storage space in comparison with the storage space which would be required for the original records kept on the microfilm. However, the microfilm records cannot be studied without projecting them and enlarging them to a size sufficient for reading.

There has been a recurring demand for a simple viewing device or a reader which will permit a card carrying the microfilm record to be moved easily by one hand from frame to frame of the microfilm within a row or to move from one row of images to another. The viewing device or reader of this invention is designed to meet this demand. It is especially suitable for use with strip film in transparent jackets or for transparent film cards which consist of film sheets bearing a number of images in a rectangular pattern, either in a single row or two or more rows.

In the viewing device or reader of the invention, the film or jacket is placed between two transparent sheets, e.g., glass plates, and is moved into the desired viewing position relative to the projection system of the device by means of a single large knob. The turning of the knob moves the transparent sheets with the film therebetween in a sideward direction relative to the front of the device. With films or jackets of the character described, the turning of the knob may be used to shift the microfilm along a row of images thereon. Pushing or pulling the knob shifts the viewing region relative to the projection system of the device forwardly or backwardly, i.e., from one row of images to another row on the microfilm.

Briefly, the viewing device or reader of the invention comprises a light source which projects its light through a transparent holding means for the microfilm into a focusing lens. The image is reflected by a mirror system inside the cabinet of the viewing device or reader onto a self-contained screen. The projected image is enlarged to a size sufficient for reading off the screen.

The light source and the focusing lens are stationary, while the transparent holding means and the microfilm therebetween are movable relative thereto from side to side and front to rear or rear to front. This relative movement is achieved by mounting the transparent holding means on a carriage having a sliding movement in one direction relative to the light source and the focusing lens. The turning knob is also mounted on this carriage and has operatively connected therewith a mechanical system for shifting the transparent holding means in a direction transverse to the direction of shifting of the carriage. With this mechanism, the carriage may be shifted in one direction, e.g., to a particular row of images on a microfilm. Then the knob may be turned to shift the transparent holding means on the carriage in a direction transverse to the sliding direction of the carriage, e.g., from frame to frame in the aforesaid row of images.

An important object of the invention is to provide a projector viewer in which a part of the total image or one frame of a multi-frame image-containing sheet such as microfilm may be selected for viewing in the projector viewer by manual adjustment via a single control member; a still further object being to provide said holding means mounted on a frame carried by and movable relative to a carriage in one direction, said carriage being mounted for movement in another direction; a further object being to provide mechanism by which said frame is shifted relative to said carriage by the turning of a knob, which knob is mounted on said carriage and may be used to move said carriage in its direction of movement.

Another important object of the invention is to provide a transparent holding device for holding an image-containing sheet; a further object being to provide a lower and upper transparent plate structure, between which plates an image-containing sheet may be inserted and held, with novel means holding said upper plate and providing for pivotal raising of the upper plate for insertion or removal of the image-containing sheet between said plates; a still further object being to provide parts of simple construction for holding the upper plate in the raised position.

Still another important object of the invention is to provide a projector viewer in which the image is folded by a mirror system including a mirror with an adjustable angle of tilt.

Figure 2:
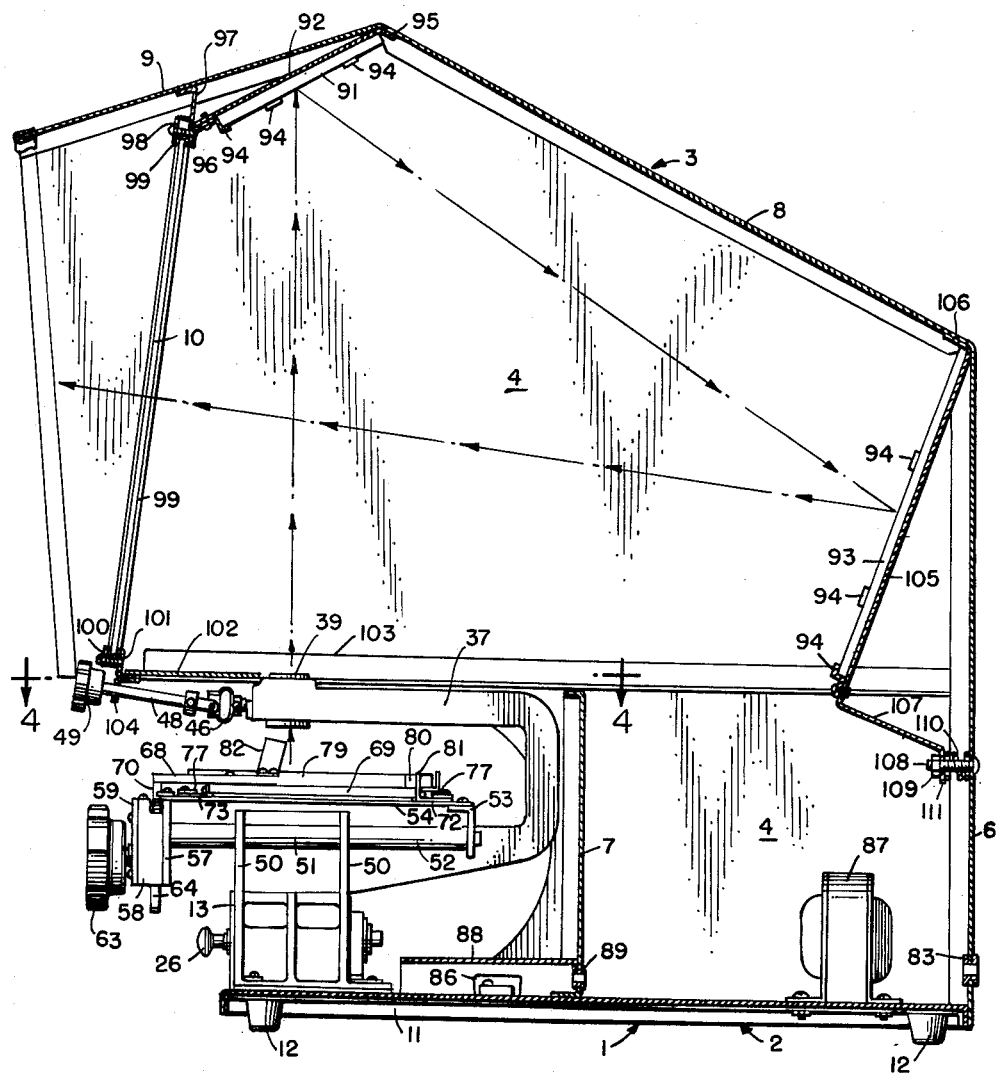
Figure 3:
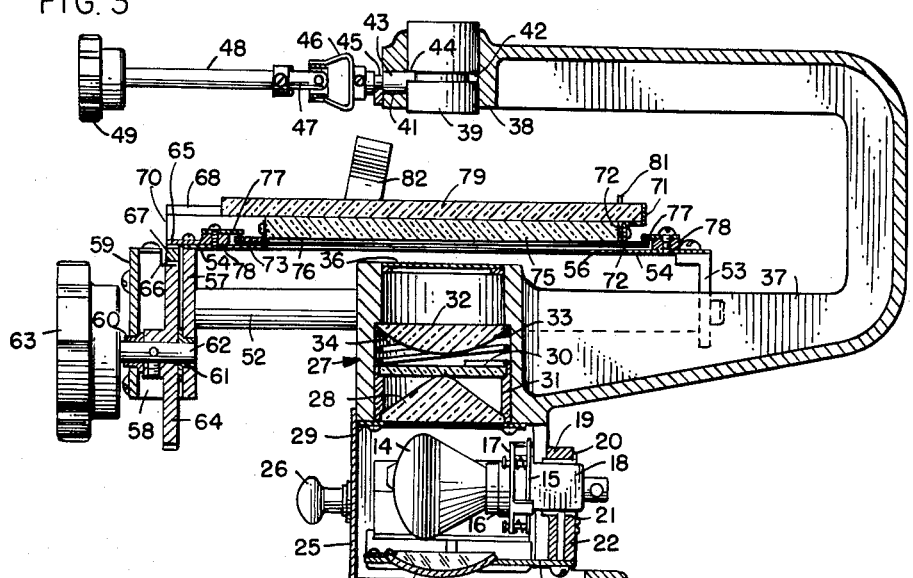
Figure 4:
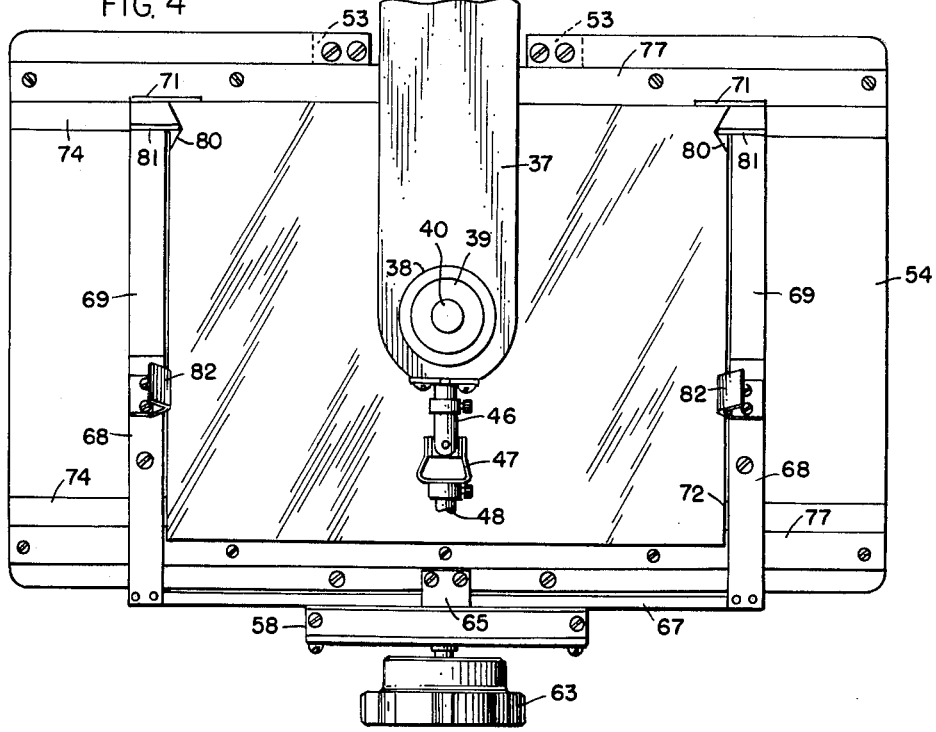

These, and other advantages of the invention, may be achieved by reader or viewing device construction following the generic principles of the invention herein described. These generic principles are further illustrated in the specific embodiment of the invention shown in the drawings wherein:

FIG. 1 is a front elevation of the embodiment;
FIG. 2 is a side elevation in cross-section of the embodiment, taken on section 2—2 of FIG. 1;
FIG. 3 is a side elevation in cross-section, taken on section 3—3 of FIG. 1, and showing the details of the light projector construction, the carriage construction, and the focusing lens; and
FIG. 4 is a top plan view of a segment of the device as used from section 4—4 of FIG. 2, wherein the upper knob and a portion of its shaft are broken away.

With reference to the drawings, the viewing device comprises a housing cabinet 1 comprising a lower base segment 2 and an upper screen and mirror segment 3. The cabinet 1 comprises side walls 4, 5, a rear wall 6, a front wall 7 for the base segment 2 and sloping, top wall sections 8, 9. The screen and mirror segment 3 has a translucent projection screen 10 mounted across the front thereof. The screen 10 is positioned rearwardly of the forward edges of side walls 4 and 5 and top wall section 9 to shade it against direct, outside light.

The walls 4, 5, 6 and 7 are attached to a base plate 11. The base plate 11 has four feet 12 on which it rests when placed on a supporting surface. There is also mounted on the base plate a projector lamp housing 13 in which an incandescent lamp 14 (FIG. 3) is mounted in a lamp socket 16. The lamp socket 16, in turn, is mounted on a spring mount support 17 to cushion the delicate lamp filament or filaments in the event the viewing device or reader is jarred.

The spring mount support 17 is resiliently mounted on a ring 15. The ring 15 is carried by a base 18 which is rigidly supported in a plate 19 extending across an opening in the rear wall of the housing 13 through which opening projects the base 18. The plate 19 is attached to the rear wall by suitable means, such as screws. The base 18 is mounted in the plate 19 inside a sleeve 20 having a groove 21 in the lower side thereof. A pin 22 in the plate 19 extends into this groove for the purpose of preventing rotation of the cylindrical wall base 18 in the plate 19 and its sleeve 20.

A concave, polished reflector 23 is supported below the lamp 14 on a plate 24. Plate 24, in turn, is attached by screws to the underside of the plate 19.

There is mounted on the front of the lamp housing 13 a removable door 25 having two handles 26. These handles carry locking mechanism (not shown) for removably holding the door 25 on the lamp housing 13. The purpose of this door is to provide access to the lamp housing for changing the lamp.

The upper portion of the lamp housing 13 is a condenser lens section 27 in which a lower condenser lens 28 is supported on a ring 29 attached to the underside of the condenser lens section 27. A planar glass 30 is supported above the lens 28 on a hollow cylindrical member 31. The upper condenser lens 32 is pressed against the annular shoulder 33 inside the lens housing by a helical spring 34 which presses against the edge of the lens 32. The opening in the upper end of the condenser lens section 27 is covered by a heat filter 36.

Integral with and projecting rearwardly from the lamp housing 13 and its condenser lens section 27 is one leg of a U-arm 37. The other leg of the U-arm 37 carries a hub 38 in which is slidably mounted the objective lens barrel 39. This barrel is adjustably slidable in the hub 38 in a direction toward and away from the lamp housing 13 so that the projected image can be focused. A lens 40 (FIG. 4) is mounted in the lens barrel 39. The lens barrel 39 is positioned in the light path projection from the condenser lens section 27, being disposed above and substantially concentric with the condenser lens section 27.

The lens barrel 39 has a groove 42 in which rides a radially offset pin 44 of the cylindrical head 43. The head 43 is rotatably journalled in a cylindrical hole 41 in the hub 38. Rotation of the head 43 causes the pin 44 to move the lens barrel 39 up and down in the hub 38.

The shaft 45 of the cylindrical head 43 is attached to a yoke 46. The yoke 46, in turn, has pivotally connected thereto an opposing, second yoke 47 which is attached to a shaft 48 of a knob 49 by which the head 43 can be turned via the mechanical linkage described. The knob 49 is positioned on the viewing device adjacent the lower end of the screen 10, where the knob can be conveniently reached for focus of the image on the screen 10.

The lamp housing 13 includes front and rear outwardly extending plates 50 having aligned apertures through which slidably extend slide rods 51, 52. On the rearward end of each slide rod 51, 52 is mounted a support bracket 53 to which is attached a support plate 54. The support plate 54 has a large, rectangular opening 56 in the center thereof corresponding in size to the size of lower plate 75, hereafter described. The front edge of the plate 54 is supported on the rear wall 57 of a hollow gear housing 58. Mounted in the front wall 59 and in the rear wall 57 of the housing 58 are journal bearings 60, 61. These journal bearings rotatably support a gear shaft 62, on the end of which is attached a turning knob 63. The shaft 62 carries a pinion gear 64 whose teeth mesh with the teeth of a rack 67. The rack 67 extends through a slot 66 in the upper part of the housing 58 and is held in meshing engagement with the gear 64 by a plate 65 removably mounted on the plate 54 and extending over the upper side of the rack 67.

A pair of side bars 68 are mounted on opposite ends of the rack 67 by means of mounting blocks 70. These side bars 68 are each joined by a screw to a side bar 69. The side bars 69 are positioned on each side of the lower glass plate 75 and are joined with L-bars 72, 73, which extend along the front and rear edges of the lower plate 75. Z-brackets 71 are carried at the outer ends of the L-bar 72.

The side bars 69 and the L-bars 72, 73 form the frame for the lower glass plate 75. This glass plate is removably seated in the frame on inwardly projecting lips of plates 76 attached to the underside of the side bars 69. Thus, the frame of the lower plate is rigidly connected with the rack 67 so that the glass plate 75 and its frame moves in a lateral direction when the knob 63 is turned.

The sliding of the glass plate and its frame is facilitated by Teflon strips 74 mounted on and extending laterally across the plate 64 beneath the horizontal leg of the L-bars 72, 73. The frame for the lower glass plate 75 is precluded from motion other than the aforesaid lateral motion by means of front and rear guide plates 77 which are above and project over the outer ends of the horizontal leg of L-bars 72, 73 of the frame. The guide plates 77 are mounted on spacer bars 78 fixedly secured to the plate 54 in juxtaposition to the outer edges of the horizontal legs of the L-bars 72, 73.

The top glass plate 79 rests on the upper surface of the lower glass plate 75. Both glass plates should be of relatively good optical quality to prevent distortion. The rearward sides of the upper glass plate 79 have V-notches 80. These V-notches are set substantially against the inner sides of upstanding ears 81 at each end of the L-bar 72. This structure keeps the upper plate 79 from sliding, even when the front edge of the upper plate is raised to insert a microfilm strip jacket or a transparent film card between the plates. It will be noted from FIG. 3 that the forward edge of the upper plate 79 extends beyond the lower plate 75 so that the upper plate can be raised by hand from the front side of the viewing device or reader. The V-notches 80 and the ears 81 keep the upper plate from sliding forwardly when it is raised. The upper legs of the Z-brackets 71 assist the V-notches in preventing rearward sliding of the upper plate 79. These legs also serve as guides against which the rear edge of the film card carrying the microfilm is pressed when it is inserted between the plates. As the forward edge of the plate is raised, the sides of the plate 79 contact and spring outwardly spring clasps 82, which are fixedly mounted on the side bars 69. After the side edges of the upper plate 79 pass the bend in the spring clasps, they spring inwardly again and the plate can be rested in raised position on the outwardly sloping segments 85 of the spring clasps. A slight downward pressure on the upper plate 79 causes the spring clasps 82 to, again, spring outwardly so that the plate can be lowered.

The electrical wiring for the projector lamp 14 is conventional and, hence, is not shown in detail. The wire from a suitable power source is brought through the grommet 83 in the rear wall 6. The wiring inside the base section 2 is connected to the off-on switch 84 mounted on the front wall 7, and the transformer 87. It then extends through the grommet 89 to the safety fuse 86. The fuse 86, in turn, is wired to the lamp. The fuse 86 is mounted under a removable fuse compartment 88 located forwardly of the front wall 7 of the base segment 2.

When a microfilm transparent jacket or transparent film card is inserted and held in a flat position between the glass plates 75, 79, the light rays from the lamp 14 pass through the condenser lens section 27. These light rays then pass through the glass plates 75, 79 and the microfilm held therebetween to the focusing, objective lens 40 in the lens barrel 39. The light rays from the lens 40 are directed against an angularly disposed, planar, first surface mirror 91, from which mirror the light rays are reflected to a second angularly disposed, planar, first surface mirror 93 and from there are reflected to the translucent screen 10 for viewing. The mirror 91 is mounted on a plate 92 by clasps 94. The plate 92 has an angularly bent edge 95 welded to the upper corner of the top wall section 8. The lower edge 96 of the plate 92 is also bent and is held in position on the depending bracket plate 97 by screws. These screws also extend through a L-channel plate 98 which extends across the upper edge of the translucent screen 10 and presses against the U-channel frame 99 extending about the periphery of the screen 10.

The lower edge of the screen 10 is fixedly held in position by a similar L-channel 100 extending across the lower edge of the screen frame 99. The L-channel 100 is attached to a L-bracket 101 mounted on a horizontal plate 102. The plate 102, in turn, is supported on L-channels 103 mounted on the side walls 4 and 5 of the cabinet 1. The L-channel 101 has attached thereto a L-bracket 104 which rotatably supports the shaft 48.

The mirror 93 is supported by means of clasps 94 of the character previously described on a plate 105. The upper edge 106 of the plate 105 is angularly bent and is welded to the lower corner of the top wall section 8. The lower end of the plate 105 has an angular bend 107. The lower end of the plate 105 is supported by means of a screw 108 extending through the rear wall 6 of the cabinet 1 with a nut 109 and an helical spring 110 on opposite sides of the vertically disposed bent edge 111 of the plate 105. The angular position of the mirror 93 and its support plate 105 can be adjusted by turning the screw 108, which will draw the lower edge 111 of the plate 105 toward or away from the rear wall 6 as the screw is threaded in the nut 109.

It will be recognized from the foregoing description of the projector viewer of the invention that its structure lends itself to manufacture at low unit costs; that the structure for moving said image without rotation thereof is very servicable for selectively viewing one or several microfilm images on a multi-image microfilm or even a selected part of a microfilm image too large to be projected in total on the viewer screen; and that selective positioning in a plane extending across the light path of the image or part thereof to be viewed without rotation thereof is readily done by manual turning and/or pushing or pulling a single knob. Furthermore, the transparent plate structure providing a fixed lower transparent plate and an upper plate which can be raised and left in the raised position constitutes another important feature of the invention. A further feature of the invention relates to the angularly adjustable mounting of the rear mirror in the screen and mirror housing.

The foregoing constitutes but one embodiment of the principles of my invention. Other modifications and variations may be employed without departing from the spirit and scope of the invention and the principles thereof, which invention is set forth in the following claims.

The invention is hereby claimed as follows:

1. A projector viewer comprising a base, a lamp housing mounted on said base and containing a lamp and light condenser lenses above said lamp, a pair of horizontally spaced, parallel rods extending forwardly and rearwardly on opposite sides of said housing, means on said housing slidably journalling said rods for horizontal, front-to-rear and rear-to-front sliding thereof relative to said lamp housing, a carriage mounted on said rods and movable horizontally therewith, a frame on said carriage, means on said carriage along the front and rear edges of said frame slidably guiding said frame for horizontal movement of said frame relative to said carriage in opposite directions transverse to the sliding movement of said rods, upper and lower, horizontal, transparent plates mounted on said frame directly above said light condenser lenses, a rotatable shaft having a knob on the front of said carriage, means rotatably journalling said shaft on said frame of said carriage, a rack mounted on and extending along the front edge of said frame, and a pinion on said shaft meshing with said rack, whereby said frame can be moved horizontally on said mounting means by rotation of said knob and whereby said carriage with said frame and transparent plates thereon can be moved back and forth by pushing or pulling said knob.

2. A projector viewer as claimed in claim 1, an arm having a horizontal leg attached to said lamp housing and extending rearwardly therefrom, a rear leg extending upwardly from the rearward end of said horizontal leg, and a second horizontal leg extending forwardly from the upper end of said rear leg and above said carriage and frame, said carriage and frame being movable in the space forwardly of said rear leg and between said horizontal legs, a vertical hub in the forward end of said second, horizontal leg directly above said condenser lenses, a focusing lens vertically movably mounted in said hub, and means associated with said hub and said lens for vertically adjustably positioning said lens in said hub.

References Cited by the Examiner
UNITED STATES PATENTS

| | | | |
|---|---|---|---|
| 1,153,685 | 9/1915 | Guerzoni et al. | 88—24 |
| 1,199,943 | 10/1916 | Taylor. | |
| 1,447,444 | 3/1923 | Thurber | 95—77 |
| 2,353,241 | 7/1944 | Hughey | 88—24 |
| 2,369,248 | 2/1945 | Pratt | 88—24 |
| 2,501,453 | 3/1950 | Rowe et al. | 88—24 |
| 2,700,917 | 2/1955 | Peters et al. | 88—24 |
| 2,701,979 | 2/1955 | Pratt et al. | 88—24 |
| 2,972,927 | 2/1961 | Walter | 88—17 |
| 3,072,013 | 1/1963 | Pratt | 88—24 |

NORTON ANSHER, *Primary Examiner.*

EMIL G. ANDERSON, WILLIAM MISIEK, *Examiners.*

D. HORN, HAROLD H. FLANDERS, *Assistant Examiners.*